F. HEWITT.
PULLEY.
No. 77,284.
Patented Apr. 28, 1868.
Fig. 1.
Fig. 2.
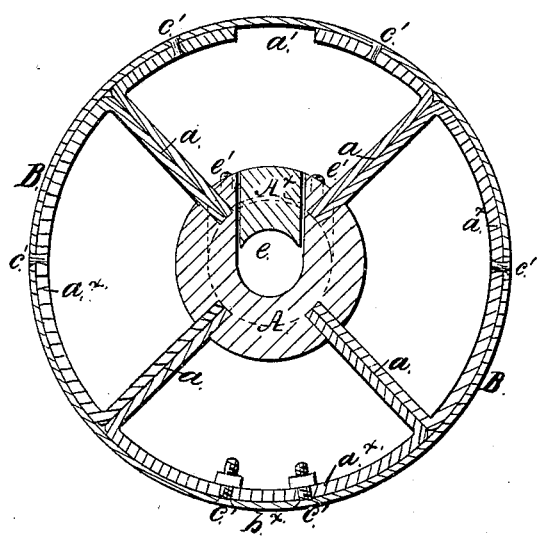
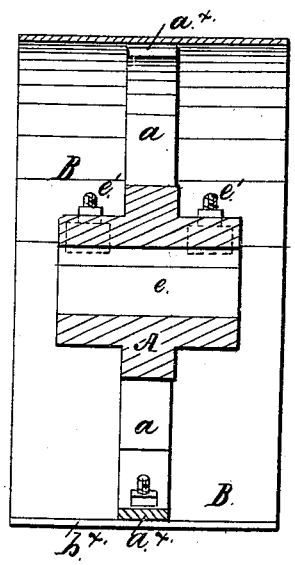
Witnesses:
Inventor:
Frederic Hewitt

United States Patent Office.

FREDERIC HEWITT, OF NEWARK, NEW JERSEY.

Letters Patent No. 77,284, dated April 28, 1868.

IMPROVEMENT IN PULLEYS.

The Schedule referred to in these Letters Patent and making part of the same.

TO ALL WHOM IT MAY CONCERN:

Be it known that I, FREDERIC HEWITT, of Newark, in the county of Essex, and State of New Jersey, have invented certain new and useful Improvements in Pulleys; and I do hereby declare that the following is a full, clear, and exact description of the same, reference being had to the accompanying drawings, making a portion of this specification, in which—

Figure 1 is a view of a pulley made according to my invention.

Figure 2 is a transverse section of the same, taken at right angles to fig. 1.

Similar letters of reference indicate corresponding parts in both figures.

The object of this invention is to enable the pulley to be attached to a shaft without removing the same from its bearings, thereby avoiding the labor and waste of time incident to placing an additional pulley upon the shaft in the ordinary manner.

The invention consists in a pulley constructed with a divided hub and removable rim; and furthermore, in the combination of wrought-iron arms and a divided rim with the aforesaid divided hub, whereby not only is the desired object effectually secured, but whereby, furthermore, a very tight and strong pulley is obtained.

To enable others to understand the nature and construction of my invention, I will proceed to describe it with reference to the drawings.

A represents the main portion of the hub, which is cast upon the inner ends of the radial spokes or arms $a$, each of the said arms being formed of two thicknesses of flat or other suitably-shaped wrought-iron rods. Each of the thicknesses of each spoke is connected with the corresponding thickness of the most adjacent spoke by an arc-shaped bar or portion, $a^\times$, formed in one with the said thickness, except at one side of the pulley, at which such connecting-portion $a^\times$ is divided by an opening, $a'$. The rim B of the pulley is placed upon the arc-shaped connecting-portions $a^\times$, as shown more clearly in fig. 1, and secured thereto by screws or bolts $e'$. At a point nearly or quite opposite the opening $a$, just mentioned, the rim B is cut or divided across, as shown at $b^\times$, in order that when detached from the other portions of the pulley it may be sprung open and over the shaft on which the pulley is to be placed, as hereinafter presently fully set forth. The hub is divided into or composed of two parts, the main or principal part, A, being formed with an opening in one side, which communicates with the central-shaft slot $e$ of the hub, and is of sufficient size to permit the shaft on which the pulley is to be secured to be placed through the same laterally into the said shaft-slot. Fitted into the opening just described is the other part of the hub, formed of a block, A, secured in place either by screws $e'$, passing through suitable lugs formed thereon, or by keys or other suitable means, the said block, when thus in place, rendering the hub complete.

In order to attach the pulley to a shaft without removing the latter from its bearings, or detaching other pulleys therefrom, the rim B is removed from the arms $a$, or, in other words, from the connecting-portions $a^\times$ thereof, and the block $A^\times$ is taken from the opening in the other part, A, of the hub, thus enabling the latter to be placed upon the shaft to which it is designed to attach the pulley, with the said shaft in its central-shaft slot $e$, as just hereinbefore indicated, whereupon the block $A^\times$ is again secured in its place, thus firmly securing the hub, with its attached arms, to the shaft, which, being done, the rim B is sprung apart at $b^\times$, and slipped over the shaft, and then bolted or fastened to the connecting-portions of the arms, as hereinbefore fully described, thus completing the putting together of the pulley and the securing thereof upon the shaft.

Although I prefer to make the arms of wrought iron, it is practicable to cast them in a piece with the main portion of the hub.

What I claim as my invention, and desire to secure by Letters Patent, is—

1. The pulley, constructed with the divided hub and the detachable rim, substantially as herein set forth, for the purpose specified.

2. The combination of the divided rim, the wrought-iron arms formed with connecting-parts $a^\times$, and the divided hub, substantially as herein set forth, for the purpose specified.

FREDERIC HEWITT.

Witnesses:
   A. LE CLERC,
   J. BRENAN.